United States Patent [19]
Studer

[11] Patent Number: 6,059,086
[45] Date of Patent: May 9, 2000

[54] DRIVE DEVICE

[75] Inventor: Werner Studer, Oberägeri, Switzerland

[73] Assignee: Electrowatt Technology Innovation AG, Zug, Switzerland

[21] Appl. No.: 09/265,032

[22] Filed: Mar. 9, 1999

[30] Foreign Application Priority Data

May 26, 1998 [EP] European Pat. Off. .............. 98109518

[51] Int. Cl.[7] .............................. F16D 43/21; F16D 7/02
[52] U.S. Cl. ........................................... 192/56.2; 464/40
[58] Field of Search ..................... 192/41 S, 56.2, 192/81 C, 55.1; 464/40

[56] References Cited

U.S. PATENT DOCUMENTS

| | | | |
|---|---|---|---|
| 2,737,274 | 3/1956 | Mouravieff | 192/41 R |
| 2,833,383 | 5/1958 | Christensen | 192/41 S |
| 2,922,220 | 1/1960 | Sacchini | 192/41 S |
| 3,125,889 | 3/1964 | Perryman . | |
| 3,306,133 | 2/1967 | Rhein et al. | 192/41 S |
| 3,893,554 | 7/1975 | Wason . | |
| 4,560,050 | 12/1985 | DeMay | 192/81 C |
| 4,630,722 | 12/1986 | Figueira et al. . | |
| 4,926,991 | 5/1990 | Stone et al. | 192/41 S |
| 5,010,983 | 4/1991 | Kitamura | 192/81 C |
| 5,064,137 | 11/1991 | Komatsu et al. . | |
| 5,090,538 | 2/1992 | Osawa | 192/81 C |
| 5,273,229 | 12/1993 | Komatsu | 192/41 S |
| 5,482,221 | 1/1996 | Peterson et al. | 192/41 S |

FOREIGN PATENT DOCUMENTS

| | | |
|---|---|---|
| 0 463 248 A1 | 1/1992 | European Pat. Off. . |
| 0 678 685 A1 | 10/1995 | European Pat. Off. . |
| 195 16 973 A1 | 10/1996 | Germany . |

OTHER PUBLICATIONS

JP 07174160A Nov. 1995, Japanese Abstract.
JP 06249257 Dec. 1994, Japanese Abstract.

*Primary Examiner*—Rodney H. Bonck
*Attorney, Agent, or Firm*—Proskauer Rose LLP

[57] ABSTRACT

A drive device for a control member which is driven by a motor in two directions has a freewheel clutch which is in the form of a wrap spring wound around a shaft. An end region of the wrap spring has at least one winding whose diameter is larger than the diameter of the shaft which is disposed in an end region of the wrap spring, so that the wrap spring does not bear against the shaft in the end region. The wrap spring effectively suppresses noise generation which would occur upon loading or blocking of the drive device, in particular in a transmission, due to oscillation of the motor.

5 Claims, 2 Drawing Sheets

DRIVE DEVICE

BACKGROUND OF THE INVENTION

1. Field of the Invention

The present invention relates to a drive device for coupling a motor to a member.

2. Description of the Prior Art

It is known to provide a drive device for a control member which is drivable by way of a free wheel clutch comprising a wrap spring.

Such drive devices are, for example, used in heating, ventilation and airconditioning installations for actuating control members such as valves or flaps and the like. The drive devices operate over a certain rotary angle range which is defined by a mechanical stop at both ends to block rotation. The blocking effect stops the rotary movement of a motor but involves the disadvantage that, particularly in the blocked condition, the drive device generates unacceptably loud noises, the cause of which is the unsteady and erratic operation of the blocked or loaded motor.

The disadvantageous noise generation can be compensated for by means of load-dependent electronic limit off switches for the motor or through the insertion of a magnetic hysteresis coupling between the motor and the transmission.

It is known for a coiled-spring or wrap-spring clutch to be used in a drive device in order to decouple a drive motor from a maximum transmitted torque, in dependence on a subsequent transmission stage. Embodiments of wrap-spring clutches are known for example from EP 678 685 A1, U.S. Pat. No. 3,125,889 and U.S. Pat. No. 3,893,554.

A drive device of this kind is known (DE 195 16 973 A1) in which a control wheel of a control member is coupled to a drive motor by way of a freewheel clutch, the freewheel clutch being embodied in the form of a wrap-spring clutch.

When wrap-spring clutches of that kind are used however the described noises are generated in the respective transitional ranges in which the wrap-spring clutch becomes operative.

SUMMARY OF THE INVENTION

One embodiment of the present invention seeks to provide a drive device with a wrap-spring clutch in which the level of noise is minimal, particularly a blocked or loaded condition.

In accordance with an aspect of the present invention there is provided a drive device for coupling a motor to a member, the drive device including a freewheel clutch comprising:

a shaft; and a wrap spring engaging said shaft;

said wrap spring having an end region, the diameter of at least one winding of said wrap spring in said end region being larger than the diameter of said shaft in said end region such that said wrap spring does not engage said shaft in said end region.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENT

Figure 1:
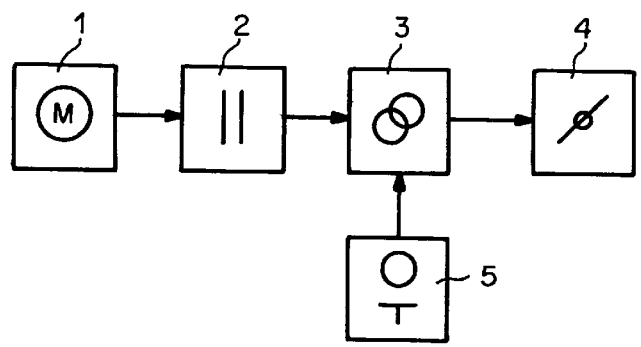
FIG. 1 is a functional block diagram showing a drive system including a drive device with freewheel clutch.

Referring to FIG. 1 reference numeral 1 denotes a motor which is coupled by way of a freewheel clutch 2 and a transmission 3 to a control member 4 in such a way that the control member 4 can be actuated in two directions by the motor 1.

The motor 1 is in the form of an electric motor, for example a synchronous motor. In an alternative configuration of the drive device—for example for resetting the control member 4 in the event of a power failure—the control member 4 is actuated not electrically but for example by way of a spring-driven motor.

The drive device advantageously also has a brake 5 which advantageously fits on the transmission and also suppresses undesirable movements in the drive device in a no-load condition.

In accordance with an embodiment of the present invention the freewheel clutch 2 is in the form of a wrap-spring clutch.

Figure 2:
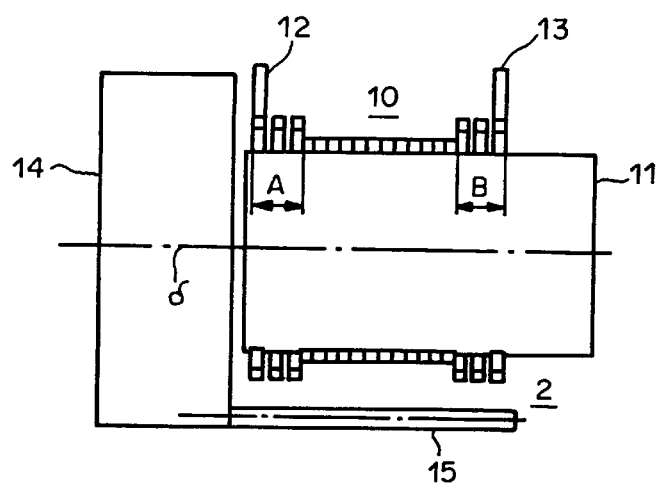
FIG. 2 shows an embodiment of the freewheel clutch.

In FIG. 2, the freewheel clutch 2 has a coiled or wrap spring 10 which is wound around a shaft 11 the ends of which are identified by references 12 and 13. An element 14 which is rotatable about an axis of rotation 6 has an entrainment element 15 which is of such an arrangement and configuration that, in a first direction of rotation of the shaft 11, the rotatable element 14 can be driven by a first end 12 of the wrap spring 10 and, in the second direction of rotation of the shaft 11, the rotatable element 14 can be driven by the second end 13. In the illustrated embodiment the motor 1 is directly connected to the shaft 11 while the rotatable element 14 is a part of the transmission 3, for example a pinion.

It will be appreciated that in principle the drive device can also be of such a design configuration that the rotatable element 14 is a part of the motor 1 while the shaft 11 is a part of the transmission 3.

In an end region A of the first end 12 of the wrap spring 10 and in an end region B of the second end 13 of the wrap spring 10 the windings of the wrap spring 10 are of a larger winding diameter than in the central region of the wrap spring 10 which is between the two end regions A and B. In the two end regions A and B therefore the wrap spring 10 does not bear against the shaft 11.

Figure 3:
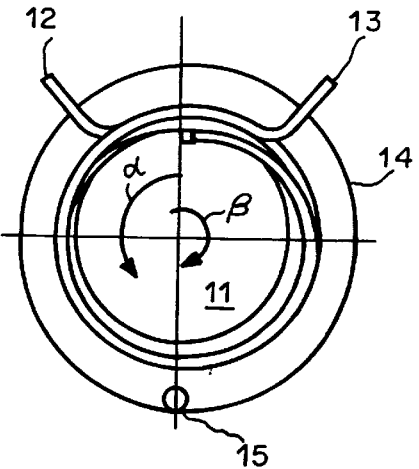
FIG. 3 shows a further view of the freewheel clutch and FIG. 4 shows an alternative configuration of the freewheel clutch.

Referring to FIG. 3, shown therein is an elevational view of the embodiment of the wrap-spring clutch 2 which is shown as a side view in FIG. 2. When the shaft 11 is rotated in the direction of rotation α about the axis of rotation δ the wrap spring 10 which is coupled to the shaft 11 is rotated with the shaft in the direction of rotation α, in which case the rotatable element 14 is entrained by the entrainment element 15 which is engaged by the first end 12 of the wrap spring 10. The rotatable element 14 and therewith the control member 4 (FIG. 1) are drivable by the motor 1 until the drive device is limited by a stop (not shown). Due to that limiting effect, a torque acts on the wrap spring 10 by way of the entrainment element 15 and the first end 12, and that torque releases the wrap spring 10 from the shaft 11 whereby the freewheel clutch 2 is released.

When the shaft 11 rotates in the direction of rotation β which is opposite to the direction of rotation α, the wrap spring 10 which is coupled to the shaft 11 is rotated with the shaft in the direction of rotation β, in which case the rotatable element 14 is also rotated by the entrainment element 15 which is engaged by the second end 13 of the wrap spring 10. The rotatable element 14 and therewith the control member 4 (FIG. 1) are drivable by the motor 1 until the drive device is limited by a stop (not shown). Due to that limiting effect, a torque acts on the wrap spring 10 by way of the entrainment element 15 and the second end 13, that torque releasing the wrap spring 10 from the shaft 11 whereby the freewheel clutch 2 is released.

The two end regions A and B each have at least one winding. Advantageously, the end region A and B respectively has about one to five windings, the number of windings being determined by the required rotary angle elasticity. The term rotary angle elasticity is used here to denote the rotary angle which the motor still has to apply when the drive device is limited, in order for the freewheel clutch 2 to be released.

It is found that the level of noise generation is substantially reduced if the freewheel clutch has a rotary angle elasticity of about 30° to 40°.

The freewheel clutch 2 according to an embodiment of the present invention has a wrap spring 10 which, at the end 12 or 13 from which the clutch function is releasable, has in the end region A or B at least one winding whose diameter is larger than the diameter of a shaft 11 which is disposed in that end region A or B of the wrap spring 10 and around which the wrap spring 10 is wound so that the wrap spring 10 does not bear against the shaft 11 in the said end region A or B.

In an advantageous embodiment of the wrap spring 10 the two ends 12 and 13 are bent up in such a way that they can be engaged by the entrainment element 15 for the transmission of torque between the shaft 11 and the rotatable element 14.

The drive device with the advantageous freewheel clutch 2 provides for the effective suppression of noise generation which would occur in particular upon blocking of the drive device, in particular in the transmission 3, due to oscillation of the motor 1.

The fact that the entrainment element 15 directly engages the spring ends 12 and 13 means that the mass at the coupling points between the entrainment element 15 and the wrap spring 10 is minimised, whereby the level of noise generation is suppressed to the maximum extent as the low-mass coupling points can follow the oscillations of the loaded or blocked motor 1 without the entrainment element 15 lifting away from the spring end 12 or 13. The level of troublesome noise generation would increase if the loaded or blocked motor 1 oscillated and the entrainment element 15 was able to lift away and knock against the spring end 12 or 13.

The fact that the two ends 12 and 13 of the wrap spring 10 are shaped in such a way that they are engageable by the entrainment element 15 for the transmission of torque between the shaft 11 and the rotatable element 14 affords a substantial increase in the permissible axial assembly tolerance between the shaft 11 and the rotatable element 14 without troublesome forces occurring between the shaft 11 and the rotatable element 14. When the drive device is in the finished assembled condition, the actual position of the axis of rotation of the rotatable element 14 and the actual position of the axis of rotation of the shaft 11 may deviate relatively greatly—that is to say for example several tenths of a millimeter—from the ideal common axis of rotation δ (FIG. 2) without the functioning of the drive device being adversely affected and without particular wear phenomena occurring on the drive device.

Drive devices of this kind generally have an automatic return function. Cessation of the drive moment of the motor 1, which occurs upon a power failure at the motor 1, triggers off an automatic return function for the drive device, whereby the spring torque or the spring energy of a stressed return spring moves the control member 4 into a predetermined position.

The wrap spring 10 with the end regions A and B permits the storage of energy with which it is possible to overcome at least a magnetic retaining moment of the motor 1 and a sticking moment of the transmission 3 which is caused by bearing friction, and that promotes the automatic return function of the drive device. By virtue of the fact that the retaining moment of the motor 1 and the sticking moment of the transmission 3 are overcome by the energy of the wrap spring 10, the return spring can be of substantially smaller dimensions without sacrifices in terms of reliability, which on the one hand saves on space and weight and on the other hand also reduces costs.

Figure 4:
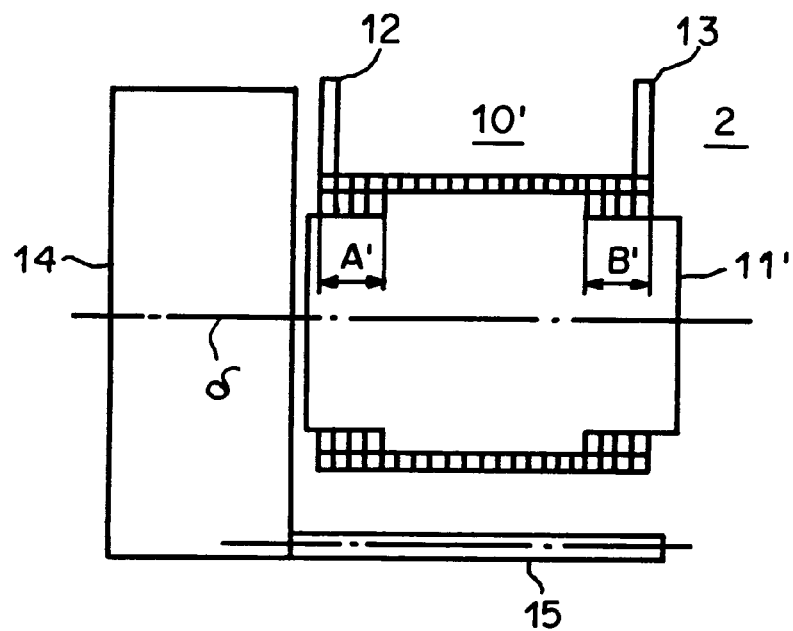

In FIG. 4 a wrap spring 10' which is wound substantially with a constant winding diameter is arranged on a shaft 11'. In an end region A' of the first end 12 of the wrap spring 10' and in an end region B' of the second end 13 of the wrap spring 10' the shaft 11' is smaller in diameter than in the central region of the wrap spring 10', which is between the two end regions A' and B'. Therefore the wrap spring 10' does not bear against the shaft 11' in the two end regions A' and B'. An alternative configuration shown in FIG. 4 of the freewheel clutch 2 with the reduced end regions A' and B' of the shaft 11' involves in principle the same mode of operation and effect as in the construction described with reference to FIGS. 2 and 3.

The use of the wrap spring 10 or 10' with the end regions A and B, and A' and B' respectively permits the inexpensive implementation in the drive device of the following functions:

overload protection in both directions of rotation,
    minization of the noise generation caused by the motor,
    reliable overcoming of retaining and sticking moments in the return function, and
    axial assembly tolerance between the axes of rotation of the driving and the driven elements.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A drive device for a control member which is drivable by a motor via a freewheel clutch to provide a clutch function between said motor and said control member, said freewheel clutch comprising:

(a) a shaft having a diameter; and
   (b) a wrap spring wound about said shaft, said wrap spring having an end region that is releasable from the clutch function, the end region having at least one winding with a diameter that is larger than the diameter of said shaft that is disposed in the end region and around which said wrap spring is wound such that said wrap spring does not bear against said shaft in the end region.

2. The drive device according to claim 1 wherein said wrap spring is wound in the end region with a larger winding diameter than in a central region of said wrap spring.

3. The drive device according to claim 1 wherein said shaft has a diameter that is reduced in said end region as compared to the diameter of said shaft in a central region.

4. The drive device according to claim 1, wherein said wrap spring is wound about a single shaft, and an end of said wrap spring is entrainable by a rotatable element of said drive device.

5. The drive device according to claim 1 wherein an end of said wrap spring is shaped to engage an entrainment element for transmitting torque between said shaft and a rotatable element of said drive device.

* * * * *